United States Patent
De Mers et al.

(10) Patent No.: US 9,457,896 B2
(45) Date of Patent: Oct. 4, 2016

(54) ELECTRIC TAXI SYSTEM WITH SPEED CONTROL (ETSSC)

(71) Applicant: HONEYWELL INTERNATIONAL INC., Morristown, NJ (US)

(72) Inventors: Robert E. De Mers, Nowthen, MN (US); Olukayode Olofinboba, Eden Prairie, MN (US); Keith Hughes, Peoria, AZ (US); Joseph Ott, St. Louis Park, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 212 days.

(21) Appl. No.: 14/163,332

(22) Filed: Jan. 24, 2014

(65) Prior Publication Data

US 2015/0210383 A1 Jul. 30, 2015

(51) Int. Cl.
*B64C 25/00* (2006.01)
*B64C 25/40* (2006.01)
*B64D 31/04* (2006.01)

(52) U.S. Cl.
CPC ............. *B64C 25/405* (2013.01); *B64D 31/04* (2013.01); *Y02T 50/823* (2013.01)

(58) Field of Classification Search
CPC ..................................................... B64C 25/405
USPC ................................................. 244/50, 103 R
See application file for complete search history.

(56) References Cited

U.S. PATENT DOCUMENTS

| | | | |
|---|---|---|---|
| 5,039,037 A | 8/1991 | DeLuca | |
| 5,104,063 A * | 4/1992 | Hartley | B64C 25/40 244/103 R |
| 6,046,560 A * | 4/2000 | Lu | B62D 5/0463 180/443 |
| 6,450,448 B1 * | 9/2002 | Suzuki | B64C 25/405 244/100 R |
| 7,975,960 B2 * | 7/2011 | Cox | B64C 25/36 244/103 R |
| 8,090,483 B2 | 1/2012 | Pepitone et al. | |
| 8,090,485 B2 | 1/2012 | Grinits et al. | |
| 8,894,005 B2 * | 11/2014 | Onomichi | B64C 25/50 244/50 |
| 8,897,930 B2 * | 11/2014 | Bayer | B64C 25/405 244/103 R |
| 2007/0282491 A1 * | 12/2007 | Cox | B64C 25/40 701/3 |
| 2013/0057414 A1 * | 3/2013 | Nutaro | G08G 5/065 340/958 |

* cited by examiner

*Primary Examiner* — Brian M O'Hara
*Assistant Examiner* — Keith L Dixon
(74) *Attorney, Agent, or Firm* — Shimokaji IP

(57) ABSTRACT

An electric taxi system (ETS) for an aircraft may include a ground speed sensor, a speed selection unit and a speed computer coupled to the ground speed sensor and to the speed selection unit. The speed computer may produce a speed error signal. A motor controller coupled to a wheel motor may control speed of the wheel motor responsively to the speed error signal.

15 Claims, 6 Drawing Sheets

ELECTRIC TAXI SYSTEM WITH SPEED CONTROL (ETSSC)

BACKGROUND OF THE INVENTION

The present invention generally relates to aircraft electric taxi systems (ETS). More particularly, the invention relates to control of ground speed of an aircraft as the aircraft is taxied by the ETS.

A typical aircraft may taxi to and from runways with thrust force developed by its engines that are optimized for high speed at altitude operation not ground idle. A significant amount of fuel may be burned by the engines during a typical aircraft taxi profile before and after each flight. In many cases, the main engines may provide more motive force than is required to complete a successful taxi profile and brakes have to be applied to slow the aircraft down. The actual speed is determined by engine thrust, aircraft weight, rolling friction and atmospheric conditions. In that regard, engine-thrust taxiing may be considered inefficient and may contribute to high fuel costs and ground level emissions.

Nevertheless, many existing aircraft and many experienced pilots are familiar with using throttle controls to regulate ground speed of an aircraft during taxiing. It would be desirable to provide the benefits of ETS in existing aircraft and to employ a speed controls systems for an ETS that could be operated in a manner similar to existing thrust based taxiing controls. Indeed, it would be desirable to provide even more options for speed control than those that presently exist in thrust based systems.

The motors of an ETS have significantly less power that the jet engines they replace and are only intended for low speed operation. Therefore an aircraft taxiing with an ETS will accelerate more slowly than an aircraft that is taxiing under jet power. Thus a pilot using an ETS may employ maximum power to accelerate an aircraft during taxiing. But when a desired speed is achieved the pilot may not know an appropriate control-lever-positioning to maintain the desired speed. Slow acceleration makes it difficult to adjust if one gets it wrong.

As can be seen, there is a need for a ground speed control system that can be retrofitted into an aircraft along with an ETS. More particularly, there is a need for such a speed control systems that employs pilot interfaces that are similar to those which pilots are presently familiar. Moreover there is a need for controls which display both commanded and actual speed and which have the capability of holding a commanded speed.

SUMMARY OF THE INVENTION

In one aspect of the present invention, an electric taxi system (ETS) for an aircraft may comprise: a ground speed sensor; a speed selection unit; a speed computer coupled to the ground speed sensor and to the speed selection unit, the speed error summer producing a speed error signal; and one or more motor controllers coupled to one or more wheel motors to control speed of the wheel motors responsively to the speed error signal.

In another aspect of the present invention, speed control apparatus for an aircraft electric taxi system (ETS) may comprise: a ground speed sensor; a speed selection unit that includes a target speed selector and a hold ground-speed selector; and a speed computer coupled to the ground speed sensor and to the speed selection unit, the speed computer producing a speed error signal to one or more motor controllers coupled to one or more wheel motors to control speed of the wheel motors responsively to the speed error signal.

In still another aspect of the present invention, a method for controlling ground speed of an aircraft may comprise the steps of: providing for sensing ground speed of the aircraft; providing for selecting a desired ground speed of the aircraft; producing a speed error signal based on sensed ground speed compared to desired ground speed; and controlling speed of a wheel motor of an electric taxi system (ETS) responsively to said speed error signal.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides an ETS for an aircraft. The ETS may employ a ground speed control system that can be retrofitted into an aircraft along with the ETS. More particularly the ground speed control system may display both commanded and actual speed and may have the capability of holding a commanded speed. Moreover, the speed control systems may employ pilot interfaces that are similar to those with which pilots are presently familiar.

Figure 1:
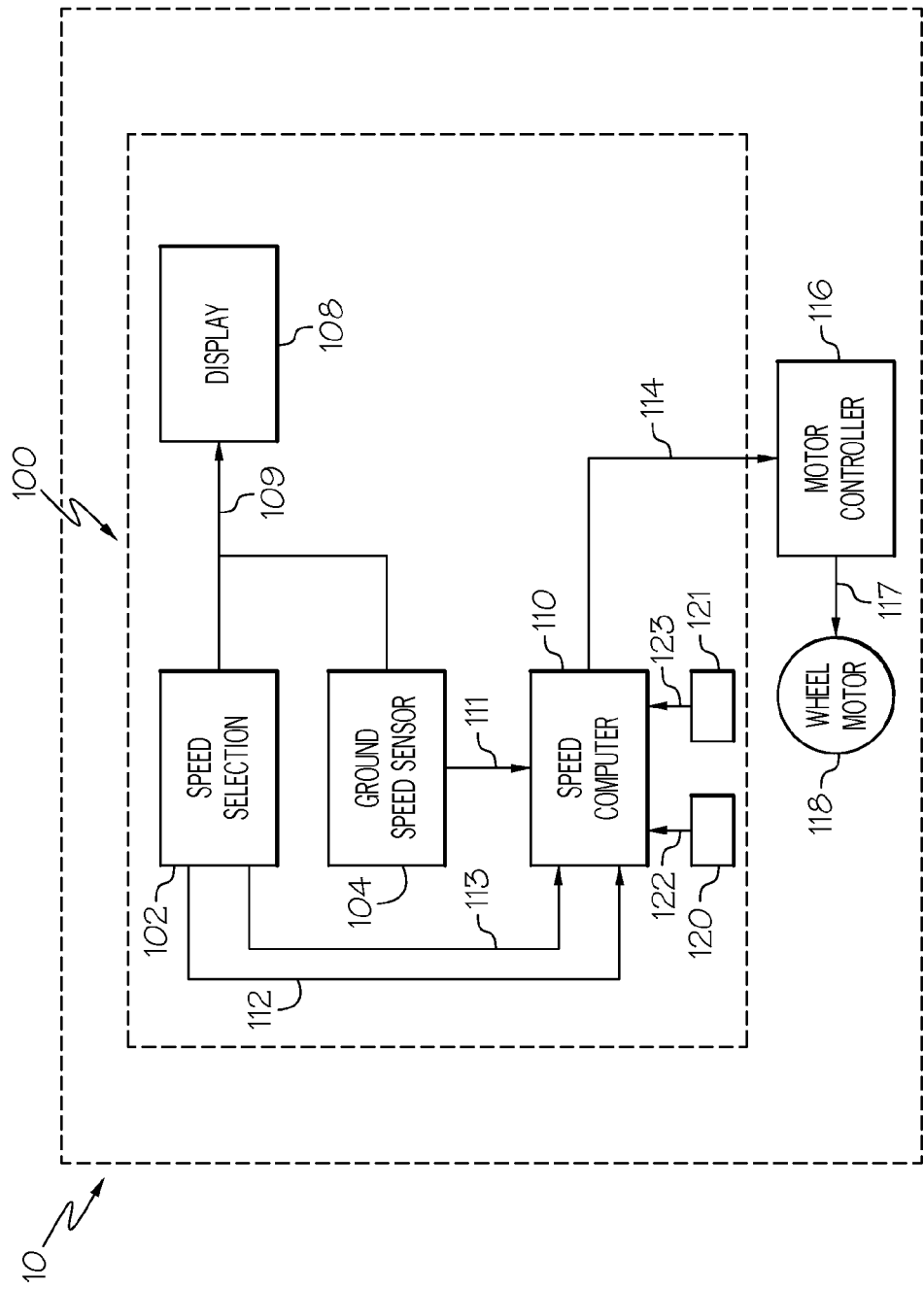
FIG. 1 is a schematic diagram of an electric taxi system (ETS) in accordance with an embodiment of the invention.

Referring now to FIG. 1, an exemplary embodiment of a speed control system 100 for an aircraft electric taxi system 10 (ETS) is shown in schematic form. The speed control system 100 may include a speed selection unit 102 and a ground-speed sensor 104. The speed selection unit 102 and the ground speed sensor 104 may be coupled to a display unit 108 and to a speed computer 110. The ground speed sensor 104 may produce a ground speed signal 111 by deducing ground speed from nose-wheel or main landing gear wheel rotation, or directly from IRS, AHRS, GPS systems. The speed selection unit 102 may provide a hold-ground speed signal 112 and/or a target ground speed signal 113 to the speed computer 110. A speed error signal 114 may be produced by the speed computer 110. Responsively to the speed error signal 114, one or more motor controllers 116 may provide motor speed signals 117 to one or more wheel motors 118 of the ETS 10.

A display unit 108 may be coupled to the speed selection unit 102 and ground speed sensor 104 and may receive display signals 109 that are representative of the target ground speed signal 113 and the ground-speed signal 111. The display unit 108 may be positioned in a cockpit of the aircraft so that it may be seen by a pilot of the aircraft.

Brake-application sensors 120 and 121 may be coupled to the speed computer 110 and may provide brake actuation signals 122 and 123 to the speed computer 110 when the pilot applies braking to either or both of the wheels (not shown) of a main landing gear of the aircraft.

Figure 2:
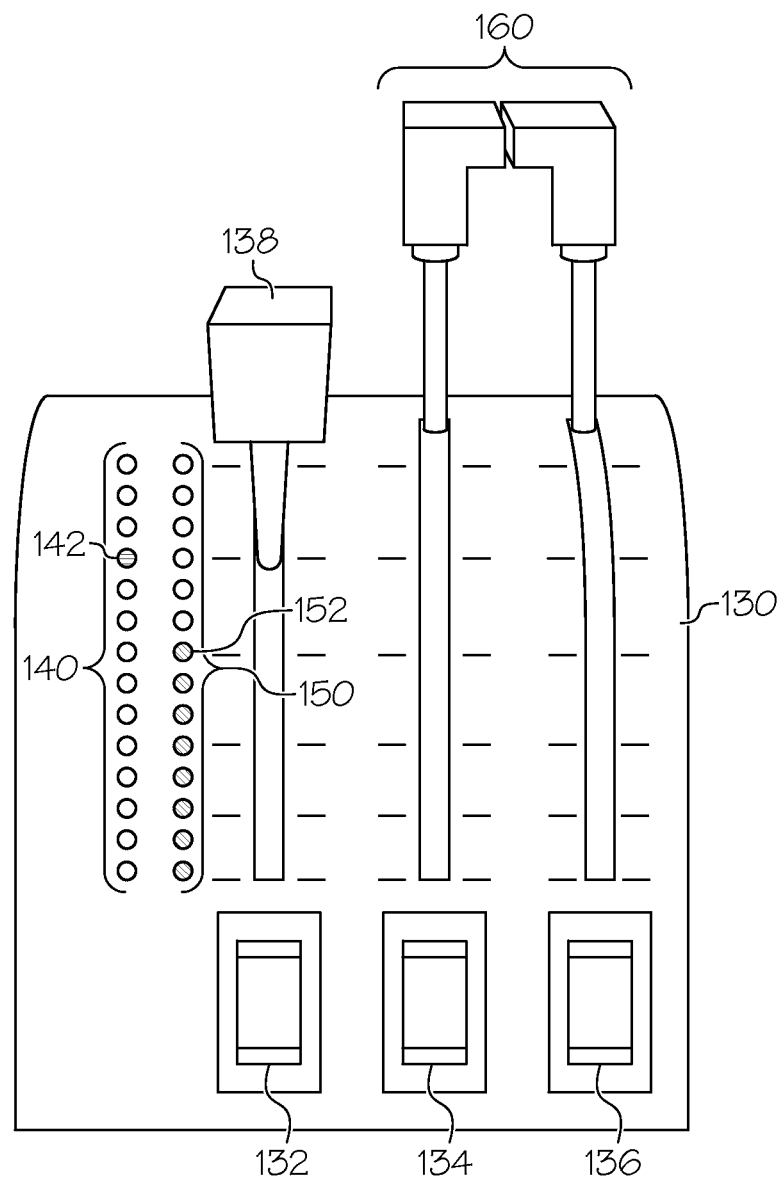
FIG. 2 is an elevation view of a throttle control assembly employed as a portion of the ETS of FIG. 1 in accordance with an embodiment of the invention.

Exemplary operational features of the speed control system 100 of FIG. 1 may be understood by referring now to FIG. 2 along with FIG. 1. In an exemplary embodiment, the speed selection unit 102 and the display unit 108 may be incorporated into a throttle control assembly 130. The throttle control assembly 130 may be provided with an ETS-engagement selector or engage selector 132, a hold ground-speed selector 134, a resume selector 136 and a target ground-speed selector 138. A pilot of an aircraft may choose to taxi the aircraft at some target ground speed or at a speed that corresponds to a present ground speed of the aircraft. If the pilot chooses to taxi at the then present ground speed of the aircraft, he or she may engage the hold ground-speed selector 134 which may then provide the hold ground-speed signal 112 to the speed computer 110. In that case, the speed computer 110 may work in conjunction with the ground speed sensor 104 to provide the speed error signal 114 based on errors relative to the then present ground speed of the aircraft.

Alternatively, the pilot may elect to taxi the aircraft at some target speed different from the then present ground speed. In that case, the pilot may engage the target ground speed selector 138 which may then provide a target ground-speed signal 113 to the speed computer 110. In that case, the speed computer 110 may work in conjunction with the ground speed sensor 104 to provide the speed error signal 114 based on errors relative to the selected target ground speed of the aircraft.

In still another exemplary mode of operation, the pilot may elect to hold speed of taxiing and to also pre-select a target speed of taxiing which may begin at some later time. In that case, the pilot may engage both of the selectors 134 and 138, thus holding the present speed and setting the selector 138 to the target ground speed. If the resume selector 136 is pressed after the hold ground-speed selector 134 is operational, the control system 100 may return the ETS 10 to normal operation. The pilot may then operate the ETS-engagement selector 132 and the system 100 may begin operating so that the speed computer may receive the target ground speed signal 113 instead of the hold ground-speed signal 112. The aircraft may then begin accelerating or decelerating to a ground speed that corresponds to the target speed selected by the pilot with the target ground speed selector 136. This allows pre-selection of a target speed for use after a hold is released.

A collection of indicator lights, such as light-emitting diodes (LED's) may be employed to provide a display system to a pilot. In that context, the throttle control assembly 130 may be considered to incorporate the display unit 108 of FIG. 1. On the throttle control assembly 130, a first column of LEDs 140 may be employed to display the target taxiing speed selected by the pilot. An illuminated LED 142 may display that selected speed. A second column of LEDs 150 may display actual taxiing speed of the aircraft. In that case, individual ones of the LEDs may be progressively illuminated as speed increases or decreases. For example LED 152 is shown in an illuminated state and all of the LEDs of the row 150 below the LED 152 are shown in an illuminated state. Alternatively, a single column of two-color LEDS (not shown) may be employed. A first color may indicate target speed and a second color may indicate current speed. Of course, when the aircraft may finally reach a taxiing speed that corresponds to the target selected taxiing speed, then that speed is no longer to be considered a target speed but instead may be considered a present speed of the aircraft.

The resume selector 138 may be employed by the pilot to instruct the ETS 10 to resume its taxiing operation after a disengagement of the ETS 10. Such disengagement may occur through operation of brakes, as explained hereinafter below. Upon operation of the resume selector 136, the ETS 10 may begin its taxiing operation based on the speed computer 110 receiving the signal 112 or the signal 113 depending upon which of the two signals were being provided to the speed computer 110 prior to disengagement of the ETS 10.

Figure 3:
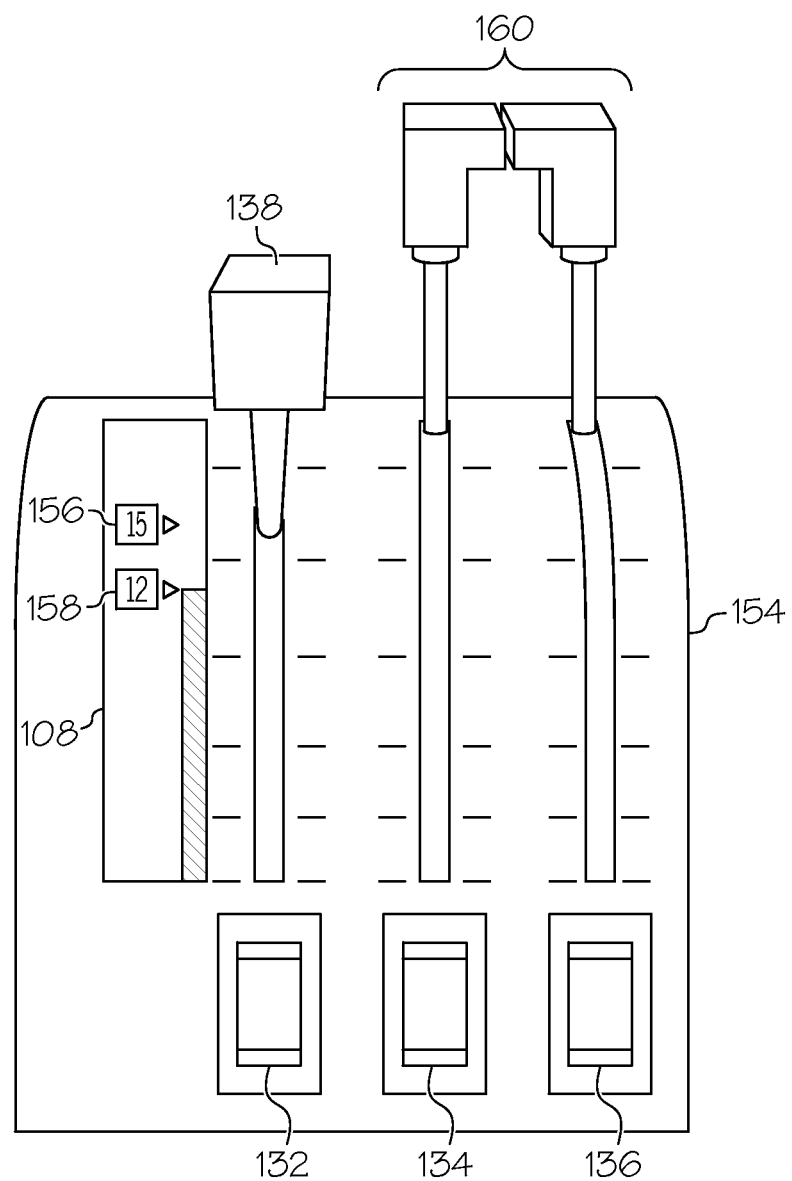
FIG. 3 is an elevation view of another embodiment of a throttle control assembly employed as a portion of the ETS of FIG. 1 in accordance with an embodiment of the invention.

Referring now to FIG. 3, there is shown another exemplary embodiment of a throttle control assembly 154 which may incorporate the speed selection unit 102 and the display unit 108 of FIG. 1. An electronic display device such as a liquid crystal display (LCD), an organic LED, e-ink or plasma device may be employed to provide a display system to a pilot. In that context, the throttle control assembly 154 may be considered to incorporate the display unit 108 of FIG. 1.

On the throttle control assembly 154, a first electronic display device 156 may be employed to display the target taxiing speed selected by the pilot. A second electronic display device 158 may display actual taxiing speed of the aircraft. In that case, the device 158 may be progressively illuminated as speed increases or decreases. Alternatively, both speed indications may be displayed on a single device (not shown)

Figure 4:
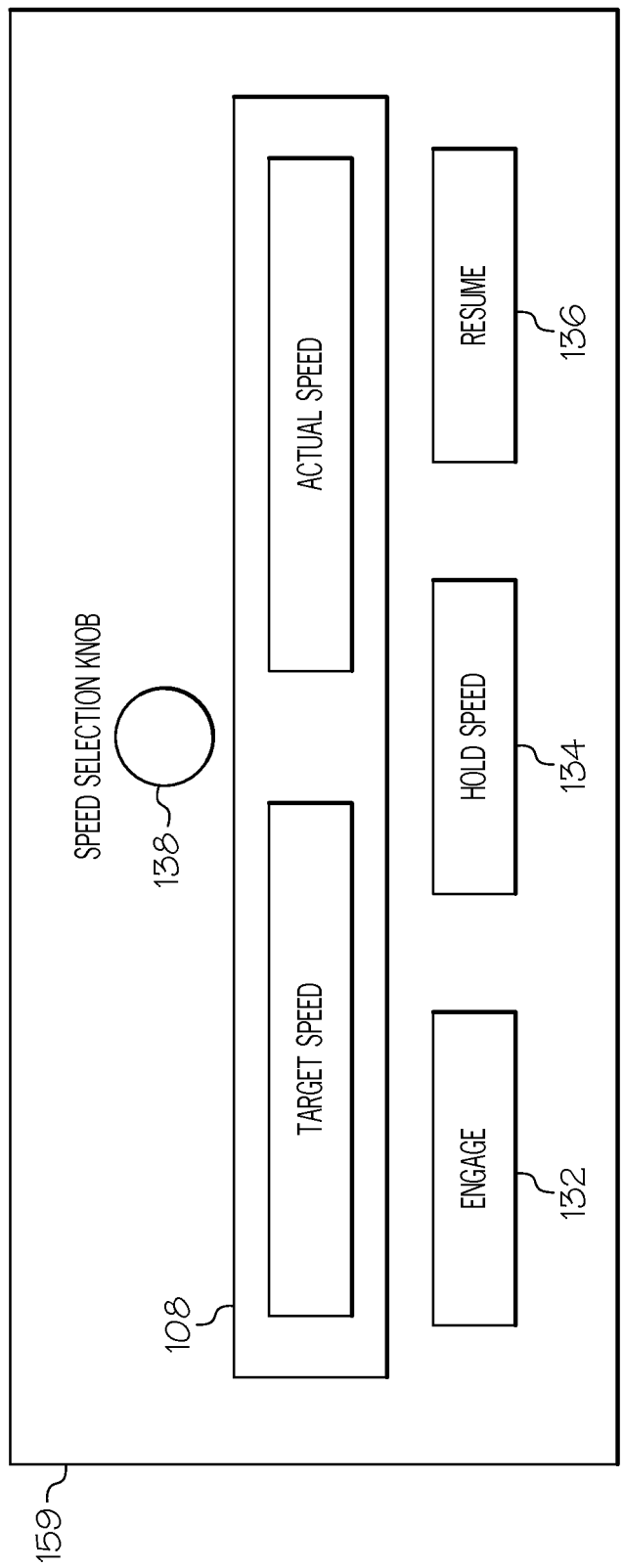
FIG. 4 is an elevation view of a pilot interface unit employed as a portion of the ETS of FIG. 1 in accordance with an embodiment of the invention.

Referring now to FIG. 4, another exemplary embodiment of pilot interface unit 159 is illustrated. The speed selection unit 102 and the display unit 108 of FIG. 1 may be incorporated into the interface unit 159. The interface unit 159 may be provided with one of the ETS-engagement selectors or engage selectors 132, one of the hold ground-speed selectors 134, one of the target ground-speed selectors 138 and one of the resume selectors 136. The interface unit 159 may be constructed to have an appearance and functionality similar to a conventional autopilot interface. In an exemplary embodiment the interface device 159 may be operable as a touch-screen device.

Figure 5:
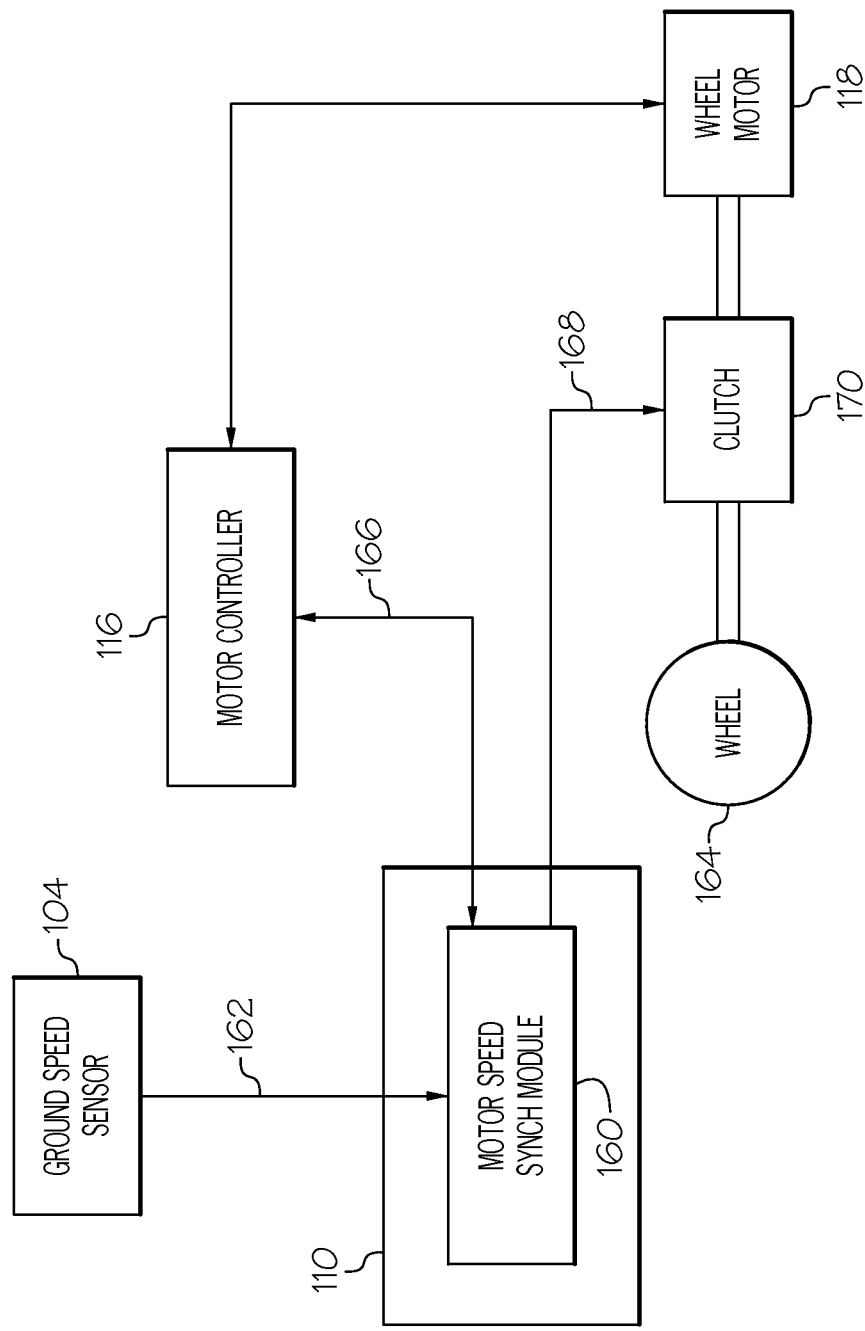
FIG. 5 is a schematic diagram of a portion of the ETS of FIG. 1 in accordance with an embodiment of the invention.

Referring now to FIG. 5, it may be seen that the speed control system 100 of FIG. 1 may be engaged to control taxiing even though the aircraft may not have come to a full stop after landing. In an exemplary embodiment of the system 100 the speed computer 110 may be provided with a motor speed synch module 160. Upon landing, the ground speed sensor 104 may provide a ground speed signal 162 to the synch module 160. As the aircraft decelerates, the synch module 160 may determine that ground speed of the aircraft has reached a speed at which a wheel 164 of the aircraft may be safely driven by the wheel motor 118. In other words, a determination may be made that the wheel motor 118 may safely drive the wheel 164 without exceeding rotational speed range limits of the wheel motor 118. When such a safe ground speed is reached, the synch module 160 may produce a synch signal 166 to the motor controller 116. The synch signal 166 may be produced responsively to the ground speed signal 162 so that the motor controller 116 may cause the wheel motor 118 to rotate at a speed that may correspond to a wheel speed equivalent to the then present ground speed of the aircraft. After the wheel motor 118 is rotating at the desired synchronized speed, the synch module 160 may produce a clutch engagement signal 168 so that a clutch 170 may couple the wheel motor 118 to the wheel 164.

The pilot may operate the ETS-engagement selector 132 of FIGS. 2 and 3 at any time during the above described sequence. However, the ETS 10 may remain in a non-operating state until after the clutch engagement signal 167 is generated.

A typical aircraft may be provided with independent left and right brake pedals. In a normal taxiing maneuver a tight turn may require the pilot to brake on the side to which the aircraft may be turning. Such a turning maneuver may not be effective if the ETS 10 were allowed to continue driving the wheel that is being braked. Thus the control system 100 may be provided with brake logic circuitry (not shown) which may operate to selectively disengage the ETS 10 when braking of either a left or right wheel or both wheels are braked.

It may be noted that disengagement of the ETS in this context may not necessarily involve de-coupling the wheels 164 of the aircraft from the wheel motors 118. Braking-induced disengagement may result in the wheel motors 118 remaining coupled to the wheels 164 through the clutches 170 while driving current to the wheel motor 118 is suspended. Thus the wheel motor 118 may continue to rotate if its corresponding wheel 164 continues to rotate. But the wheel 167 may not be provided with any driving force from the drive motor 118. Such an arrangement may prevent excessive clutch wear resulting from repeated dis-engagements and re-engagements of the clutch 170. In other words the clutch 170 may be kept engaged as much as possible.

The speed computer 110 may be set so that any one of a number of different modes of operation may automatically occur after application and subsequent release of one or more of the brakes. Possible configurations are shown in Table 1 below.

TABLE 1

Brake Control Logic

| | Left Brake | Right Brake | Left Motor | Right Motor | Brake Release |
|---|---|---|---|---|---|
| Normal | | | Drive | Drive | |
| Mode 1 | Pressed | | No Drive | Drive | No change |
| Mode 1 | | Pressed | Drive | No Drive | No change |
| Mode 1 | Pressed | Pressed | No Drive | No Drive | No change |
| Mode 2 | Pressed | | No Drive | No Drive | No change |
| Mode 2 | | Pressed | No Drive | No Drive | No change |
| Mode 2 | Pressed | Pressed | No Drive | No Drive | No change |
| Mode 3 | Pressed | | No Drive | Drive | Resume |
| Mode 3 | | Pressed | Drive | No Drive | Resume |
| Mode 3 | Pressed | Pressed | No Drive | No Drive | Resume |
| Mode 4 | Pressed | | No Drive | No Drive | Resume |
| Mode 4 | | Pressed | No Drive | No Drive | Resume |
| Mode 4 | Pressed | Pressed | No Drive | No Drive | Resume |

Table 1 represents two different design philosophies. Do not resume power after braking or resume power and speed target after braking.

Figure 6:
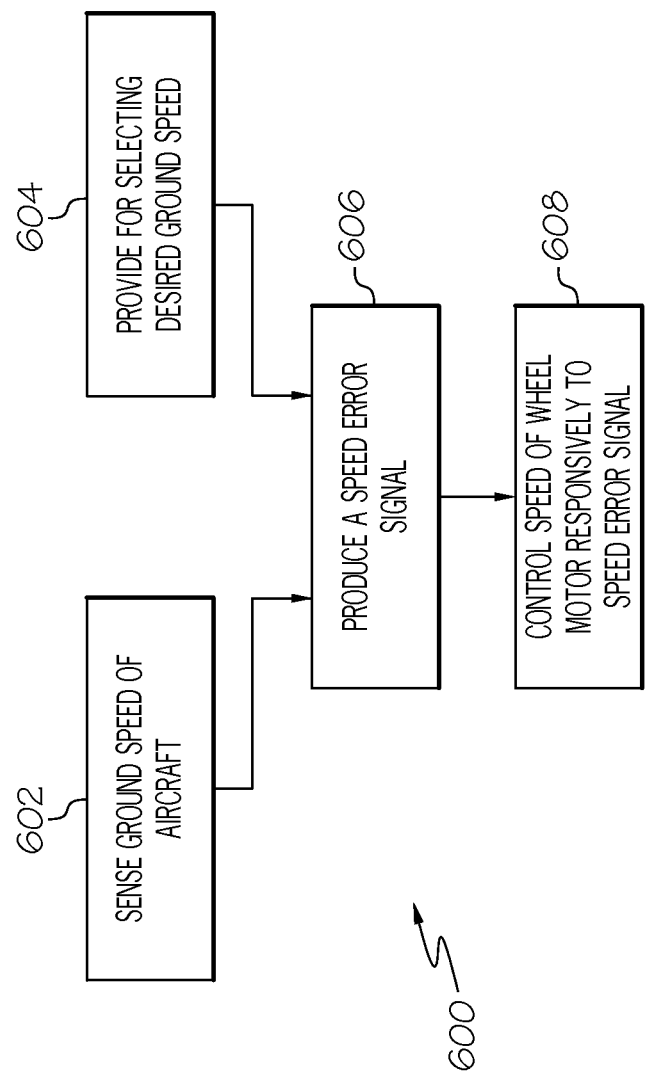
FIG. 6 is a flow chart of a method for controlling ground speed of an aircraft in accordance with an embodiment of the invention.

Referring now to FIG. 6, a flow chart 600 may illustrate an exemplary method for controlling ground speed of an aircraft. In a step 602, sensing ground speed of the aircraft may be provided (e.g., the ground speed sensor 104 may sense ground speed). In a step 604, selecting a desired ground speed of the aircraft may be provided (e.g., the speed selection device 102 may be employed to select a desired ground speed). In a step 606, a speed error signal may be produced (e.g., the speed error signal 114 may be produced by the speed computer 110). In a step 608, speed of a wheel motor of an electric taxi system (ETS) may be controlled responsively to the speed error signal (e.g., the motor controller 116 may control speed of the wheel motor 118 responsively to the speed error signal 114).

It should be understood, of course, that the foregoing relates to exemplary embodiments of the invention and that modifications may be made without departing from the spirit and scope of the invention as set forth in the following claims.

We claim:

1. An electric taxi system (ETS) with speed control for an aircraft comprising:
 a ground speed sensor;
 a speed selection unit;
 wherein the speed selection unit enables taxiing of the aircraft optionally at a present ground speed or a target ground speed that is different from the present ground speed;
 a speed computer coupled to the ground speed sensor and to the speed selection unit, the speed computer producing a speed error signal; and
 one or more motor controllers coupled to one or more wheel motors to control speed of the wheel motors responsively to the speed error signal;
 wherein, upon enabling taxiing at the present ground speed;
 a hold ground speed signal is sent to the speed computer, and
 the speed computer works in conjunction with the ground speed sensor to provide the speed error signal based on errors relative to the present ground speed;
 wherein, upon enabling taxiing at the target ground speed;
 a target ground speed signal is sent to the speed computer, and
 the speed computer works in conjunction with the target ground speed signal to provide the speed error signal based on errors relative to the target ground speed.

2. The ETS of claim 1 wherein the speed selection unit comprises:
 a target speed selector; and
 a hold ground-speed selector.

3. The ETS of claim 2 further comprising a resume selector coupled to the target speed selector and to the hold ground-speed selector so that upon actuation of the resume selector, ground speed control is shifted from hold ground-speed mode to target ground speed mode.

4. The ETS of claim 1 further comprising a display unit coupled to the speed selection unit and to the speed computer.

5. The ETS of claim 4 wherein the display unit is incorporated on a throttle control assembly of the aircraft.

6. The ETS of claim 5 wherein the speed selection unit is incorporated on the throttle control assembly.

7. The ETS of claim 1 wherein the speed selection device is incorporated on a throttle control assembly of the aircraft.

8. A throttle control assembly for an aircraft electric taxi system (ETS) comprising:
- a target ground speed selector, in a first portion of the control assembly, for selecting a target taxiing speed of the aircraft;
- an actual speed display, in the first portion of the control assembly, for displaying, an actual taxiing speed of the aircraft;
- a target speed display, in the first portion of the control assembly and immediately adjacent the actual speed display, for displaying the target taxiing speed of the aircraft;
- an engage selector, in the first portion of the control assembly, for engaging the ETS;
- a motor sync module selector, in a second portion of the control assembly, for determining that a ground speed of the aircraft has reached a speed at which an aircraft wheel may be safely driven by a wheel motor of the aircraft;
- a hold ground-speed selector, in the second portion of the control assembly, for holding a then present ground speed of the aircraft; and
- a resume selector, in the second portion of the control assembly and immediately adjacent the hold ground-speed selector, for resuming taxiing operation of the aircraft after disengagement of the ETS.

9. The assembly, of claim 8 wherein the resume selector is coupled to the target ground speed selector and to the hold-ground-speed selector so that upon actuation of the resume selector, ground speed control is shifted from hold ground-speed mode to selected ground speed mode.

10. The assembly of claim 8 further comprising a display unit incorporated on the throttle control assembly of the aircraft.

11. The assembly of claim 10 wherein the display unit comprises:
- a first column of light emitting diodes (LEDs) connected to display a selected taxiing speed; and
- a second column of LEDS connected to progressively display actual taxiing speed of the aircraft.

12. The assembly of claim 10 wherein the display unit comprises one or more electronic display devices connected to display a selected taxiing speed and actual taxiing speed of the aircraft.

13. The assembly of claim 8 wherein the motor speed synch module selector is:
- coupled to a ground speed sensor to receive a ground speed signal;
- coupled to motor controllers to provide a synch signal to the motor controllers; and
- coupled to one or more clutches to provide a clutch engagement signal to the clutches so that the clutches couple one or more wheel motors with one or more wheels of the aircraft after the wheel motors rotate at a speed that causes the wheels to rotate at a ground speed that corresponds to a ground speed sensed by the ground speed sensor.

14. The assembly of claim 13 wherein the motor synch module selector provides the synch signal to the motor controllers only when ground speed of the aircraft is low enough so that a corresponding speed of the wheel motors is within a safe rotational speed range of the wheel motor.

15. A method for controlling ground speed of an aircraft comprising the steps of:
- providing for sensing ground speed of the aircraft;
- providing For holding speed of taxiing of the aircraft;
- providing for pre-selecting a target speed of taxiing of the aircraft to begin at a pre-selected time;
- after holding speed of taxiing, returning an electric taxi system of the aircraft to normal operation; and
- after returning to normal operation, accelerating or decelerating to a ground speed of the aircraft that corresponds to the target speed.

* * * * *